United States Patent
Shibuya et al.

(10) Patent No.: US 12,107,716 B2
(45) Date of Patent: Oct. 1, 2024

(54) STORED POWER PRODUCTION SOURCE MANAGEMENT DEVICE, METHOD, AND STORAGE MEDIUM

(71) Applicants: Kabushiki Kaisha Toshiba, Tokyo (JP); Toshiba Energy Systems & Solutions Corporation, Kawasaki (JP)

(72) Inventors: Masato Shibuya, Saitama Saitama (JP); Mitsuru Kanda, Tokyo (JP); Yuzuru Kurihara, Tokyo (JP); Yoshiaki Ohsako, Nagareyama Chiba (JP); Takahiro Kase, Kawasaki Kanagawa (JP); Chikara Takashima, Tokyo (JP)

(73) Assignees: Kabushiki KaishaToshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 394 days.

(21) Appl. No.: 17/530,379

(22) Filed: Nov. 18, 2021

(65) Prior Publication Data

US 2022/0078069 A1 Mar. 10, 2022

Related U.S. Application Data

(63) Continuation of application No. PCT/JP2019/019856, filed on May 20, 2019.

(51) Int. Cl.
*H04L 41/046* (2022.01)
*H02J 3/28* (2006.01)
(52) U.S. Cl.
CPC .............. *H04L 41/046* (2013.01); *H02J 3/28* (2013.01)

(58) Field of Classification Search
CPC .. Y02E 60/10; Y02E 40/70; H02J 3/32; H02J 3/46; H02J 3/28; H02J 3/381;
(Continued)

(56) References Cited

U.S. PATENT DOCUMENTS

2012/0158202 A1* 6/2012 Yano ........................ H02J 3/38
700/293
2013/0096725 A1 4/2013 Ishida et al.
(Continued)

FOREIGN PATENT DOCUMENTS

EP 2 940 649 A1 11/2015
JP 2012-16185 A 1/2012
(Continued)

*Primary Examiner* — Alicia M. Choi
(74) *Attorney, Agent, or Firm* — FINNEGAN, HENDERSON, FARABOW, GARRETT & DUNNER LLP (57) ABSTRACT

A stored power production source management device of an embodiment includes an acquisition unit, a power storage management unit, and a discharging management unit. The acquisition unit acquires first information indicating a power supply source when a power storage is charged. The power storage management unit stores information indicating a power supply source for power stored in the power storage in a data storage in association with an amount of stored power on the basis of the first information. The discharging management unit specifies a power supply source for the power to be discharged on the basis of information indicating the power supply source stored in the data storage when the power storage is discharged, and subtracts the amount of power to be discharged from the amount of power corresponding to the specified power supply source in the data storage.

9 Claims, 6 Drawing Sheets

(58) Field of Classification Search
CPC ..... H02J 7/00032; H02J 7/0047; G06F 3/067; G06F 1/263; H04L 41/046
See application file for complete search history.

(56) References Cited

U.S. PATENT DOCUMENTS

| | | | |
|---|---|---|---|
| 2017/0070089 A1* | 3/2017 | Fukubayashi | H02J 13/00028 |
| 2018/0152020 A1* | 5/2018 | Kuroda | H02J 13/00002 |
| 2018/0201142 A1* | 7/2018 | Galin | H02J 3/14 |
| 2018/0316199 A1* | 11/2018 | Lyons | H02J 7/0019 |
| 2019/0050015 A1* | 2/2019 | Mezic | H02J 13/00001 |
| 2019/0342829 A1* | 11/2019 | Klatt | H04W 52/0216 |

FOREIGN PATENT DOCUMENTS

| | | | |
|---|---|---|---|
| JP | 2012-95397 A | | 5/2012 |
| JP | 5393602 B2 | | 1/2014 |
| JP | 2018196257 A | * | 12/2018 |
| WO | WO 2015/015770 A1 | | 2/2015 |

\* cited by examiner

|  | 18:00~7:00 | 7:00~10:00 | 10:00~15:00 | 15:00~18:00 |
|---|---|---|---|---|
| SYSTEM POWER | 30 | 20 | | |
| WIND POWER GENERATION | 40 | | | |
| SOLAR POWER GENERATION | – (NOT SUPPLIED) | 35 | 10 | 35 |

| | COEFFICIENT |
|---|---|
| ELECTRIC POWER SYSTEM (10-A) | 1 |
| WIND POWER GENERATOR (10-B) | 0.97 |
| SOLAR POWER GENERATOR (10-C) | 0.95 |

| | | 15:00~18:00 | 18:00~21:00 | 21:00~24:00 | 0:00~3:00 | ... |
|---|---|---|---|---|---|---|
| SYSTEM POWER | POWER STORAGE | 250[kW] | 350[kW] | 200[kW] | – | |
| | DISCHARGING | – | 300[kW] | – | – | |
| RENEWABLE ENERGY | POWER STORAGE | 250[kW] | 150[kW] | 150[kW] | 150[kW] | |
| | DISCHARGING | – | 300[kW] | – | 250[kW] | |

FIG. 9

STORED POWER PRODUCTION SOURCE MANAGEMENT DEVICE, METHOD, AND STORAGE MEDIUM

CROSS-REFERENCE TO RELATED APPLICATION

This application is a continuation application of International Application No. PCT/JP2019/019856, filed May 20, 2019, the content of which is incorporated herein by reference.

FIELD

Embodiments of the present invention relate to a stored power production source management device, method, and storage medium.

BACKGROUND

In the related art, an invention of a power control method for displaying an amount of $CO_2$ originating from each of power sources on a display unit has been disclosed. However, with the related art, it is not possible to virtually ascertain a power supply source from which a consumer has used power, and convenience is not sufficient. A problem to be solved by the present invention is to provide a stored power production source management device, method, and program capable of enhancing convenience.

DETAILED DESCRIPTION

A stored power production source management device of an embodiment includes an acquisition unit, a power storage management unit, and a discharging management unit. The acquisition unit acquires first information indicating a power supply source when a power storage is charged. The power storage management unit stores information indicating a power supply source for power stored in the power storage in a data storage in association with an amount of stored power on the basis of the first information. The discharging management unit specifies a power supply source for power to be discharged on the basis of information indicating the power supply source stored in the data storage when the power storage is discharged, and subtracts the amount of power to be discharged from the amount of power corresponding to the specified power supply source in the data storage.

Hereinafter, a stored power production source management device, method, and storage medium of embodiments will be described with reference to the drawings.

[Overall Configuration]

Figure 1:
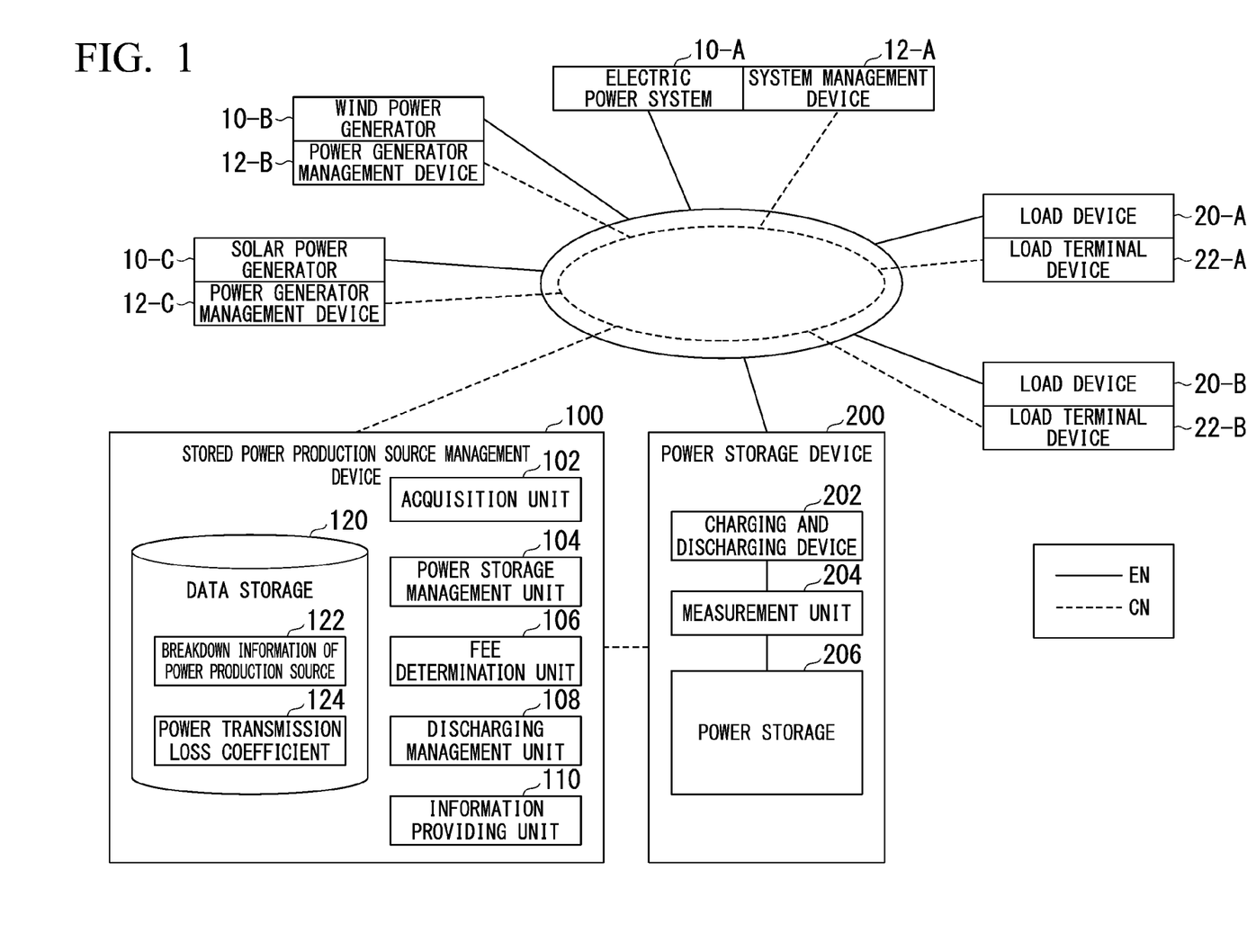
FIG. 1 is a diagram illustrating an example of a configuration and usage environment of a stored power production source management device.

FIG. 1 is a diagram illustrating an example of a configuration and usage environment of a stored power production source management device 100. The stored power production source management device 100 is a device that manages a power storage device 200. Various apparatus and devices illustrated in the figure perform transfer of power via a power network EN and perform transmission and reception of information via an information communication network CN. The information communication network CN includes, for example, a wide area network (WAN), a local area network (LAN), or the Internet.

For example, a electric power system 10-A, a wind power generator 10-B, and a solar power generator 10-C, which are power supply sources, are connected to the power network EN. These are only examples of the power supply source, and other types of power supply sources (for example, a geothermal generator and a power storage device) may be connected to the power network EN, and a plurality of power supply sources of the same type may be connected to the power network EN. The electric power system 10-A includes, for example, a thermal power generator, a nuclear power generator, a hydroelectric generator, and a power transmission and distribution network. Although not illustrated, a power conditioning system (PCS) for connection to the power network EN is connected to the wind power generator 10-B or the solar power generator 10-C. Further, for example, load devices 20-A and 20-B, which are consumers, are connected to the power network EN, and a power storage device 200 is connected to the power network EN. A power storage device different from the power storage device 200 may be connected to the power network EN.

A system management device 12-A, power generator management devices 12-B and 12-C, load terminal devices 22-A and 22-B, and the stored power production source management device 100, for example, are connected to the information communication network CN.

The system management device 12-A is a device operated by an operator (for example, a power company) of the electric power system 10-A. A plurality of generators are connected to the electric power system 10-A. The system management device 12-A transmits, for example, power generated by each generator in real time (or at intervals of 10 minutes or 1 hour). A transmission destination includes the stored power production source management device 100.

The power generator management device 12-B transmits power generator status information including an amount of power generated by the wind power generator 10-B and a power receiving request in real time (or at intervals of 10 minutes or 1 hour) on the basis of a result of measuring the amount of power generated by the wind power generator 10-B. The power generator management device 12-C transmits the power generator status information including power generated by the solar power generator 10-C and the power receiving request in real time (or at intervals of 10 minutes or 1 hour) on the basis of a result of measuring an amount of power generated by the solar power generator 10-C. In both cases, transmission destinations include the stored power production source management device 100.

The load devices 20-A and 20-B are any devices that consume power. The load terminal device 22-A is a terminal device that is used by an operator of the load device 20-A. The load terminal device 22-A transmits demand information including a discharging request for requesting discharging, information on an amount of required power, and the like for the power used by the load device 20-A to the stored power production source management device 100. The load terminal device 22-B is a terminal device that is used by an operator of the load device 20-B. The load terminal device 22-B transmits demand information including a discharging request for requesting discharging, information on a required amount of power, and the like for power used by the load device 20-B to the stored power production source management device 100. A significance of a priority will be described below.

The stored power production source management device 100 performs various processes regarding an operation of the power storage device 200. First, the power storage device 200 will be described. The power storage device 200 includes, for example, a charging and discharging device 202, a measurement unit 204, and a power storage 206.

The power storage 206 is, for example, a secondary battery, but the power storage 206 is not limited thereto and may be a power storage that converts power into other energy and stores the energy. For example, the power storage 206 may be a power storage that converts power into hydrogen and stores the hydrogen, or may be a power storage that converts power into kinetic energy and stores the kinetic energy like a flywheel.

The measurement unit 204 measures a charging and discharging current of the power storage 206, a voltage between a positive electrode and a negative electrode of the power storage 206, a temperature of the power storage 206, and the like, and outputs results thereof to the stored power production source management device 100. The charging and discharging device 202 is, for example, a PCS, and performs mutual conversion between an alternating current and a direct current.

The stored power production source management device 100 includes, for example, an acquisition unit 102, a power storage management unit 104, a fee determination unit 106, a discharging management unit 108, and an information providing unit 110. These components are realized by, for example, a hardware processor such as a central processing unit (CPU) executing a program (software). Some or all of these components may be realized by hardware (a circuit unit; including a circuit) such as a large scale integration (LSI), an application specific integrated circuit (ASIC), a field-programmable gate array (FPGA), or a graphics processing unit (GPU) or may be realized by cooperation of software and hardware. The program may be stored in a data storage device (a data storage device including a non-transient data storage medium) such as a hard disk drive (HDD) or a flash memory in advance, or may be stored in a removable data storage medium (a non-transient data storage medium) such as a DVD or a CD-ROM and installed by the data storage medium being mounted in a drive device.

The stored power production source management device 100 includes a data storage 120. The data storage 120 is, for example, an HDD, a flash memory, or a RAM. The data storage 120 may be a device attached to the stored power production source management device 100, or may be a network attached data storage (NAS) that the stored power production source management device 100 can access via the information communication network CN. Information such as the breakdown information of power production source 122 and a power transmission loss coefficient 124 is stored in the data storage 120.

Figure 2:
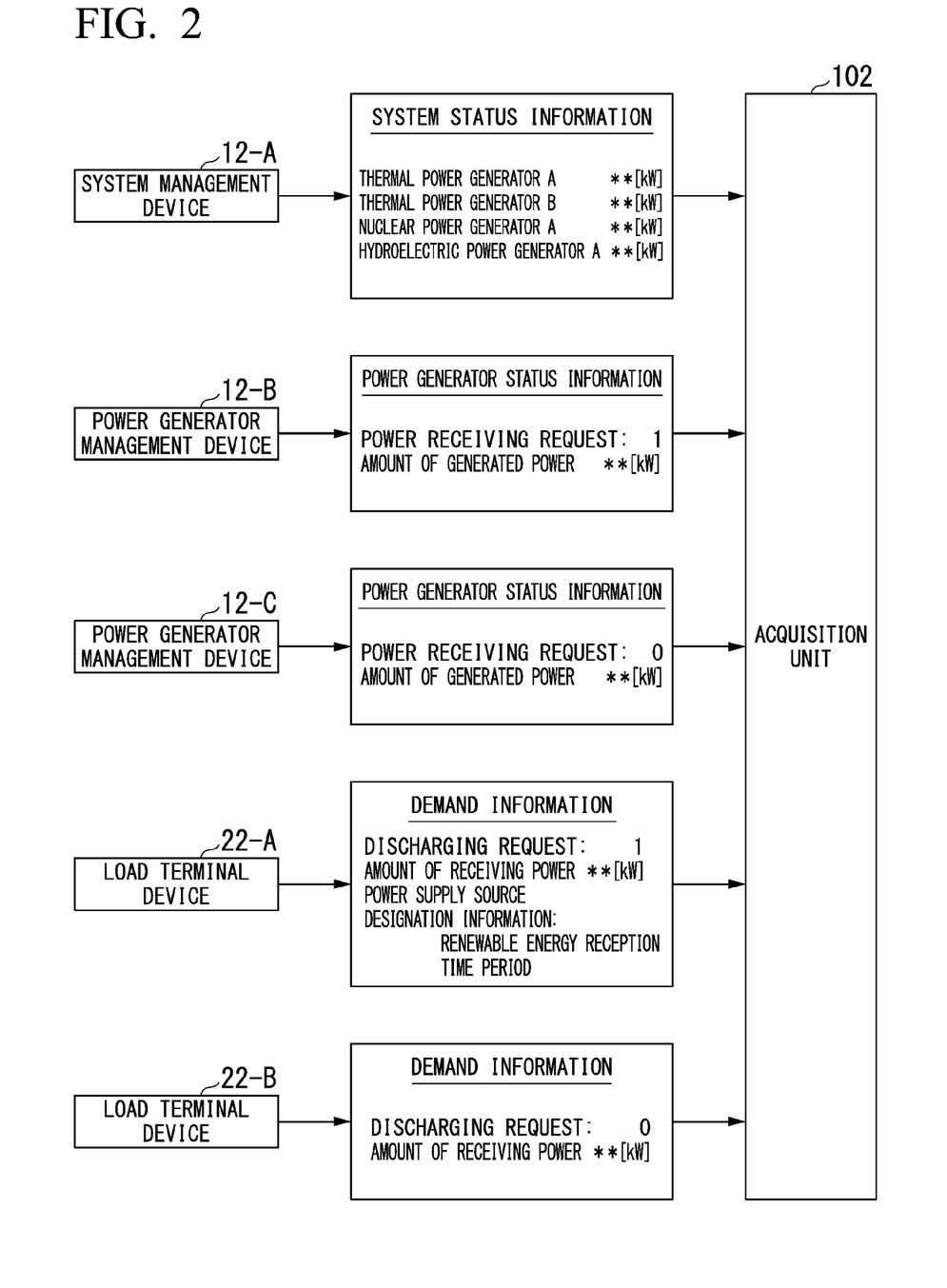
FIG. 2 is a diagram illustrating an example of information acquired by an acquisition unit.

FIG. 2 is a diagram illustrating an example of information acquired by the acquisition unit 102. The acquisition unit 102 acquires system status information from the system management device 12-A, which is a device of a power supply source, and power generator status information from the power generator management devices 12-B and 12-C. At least one of the system status information and the power generator status information is an example of first information. The system status information includes, for example, an amount of power generated by each generator. The power generator status information includes, for example, a power receiving request and an amount of generated power. The power receiving request is represented by, for example, a binary value of 0 or 1, in which 0 indicates that power receiving is not requested and 1 indicates that the power receiving is requested.

The acquisition unit 102 acquires demand information from the load terminal devices 22-A and 22-B, which are devices of consumers. The demand information is an example of second information. The demand information includes, for example, a discharging request, a power receiving amount which is information on required power, power supply source designation information, and a power receiving time period. The discharging request is expressed by, for example, a binary value of 0 or 1, in which 0 indicates that discharging is not requested and 1 indicates that discharging is requested. The power supply source designation information is expressed by, for example, a binary value of whether energy is renewable energy (hereinafter renewable energy) or not. In the example of FIG. 1, the renewable energy is power generated by the wind power generator 10-B or the solar power generator 10-C.

[Power Storage Management]

Figure 3:
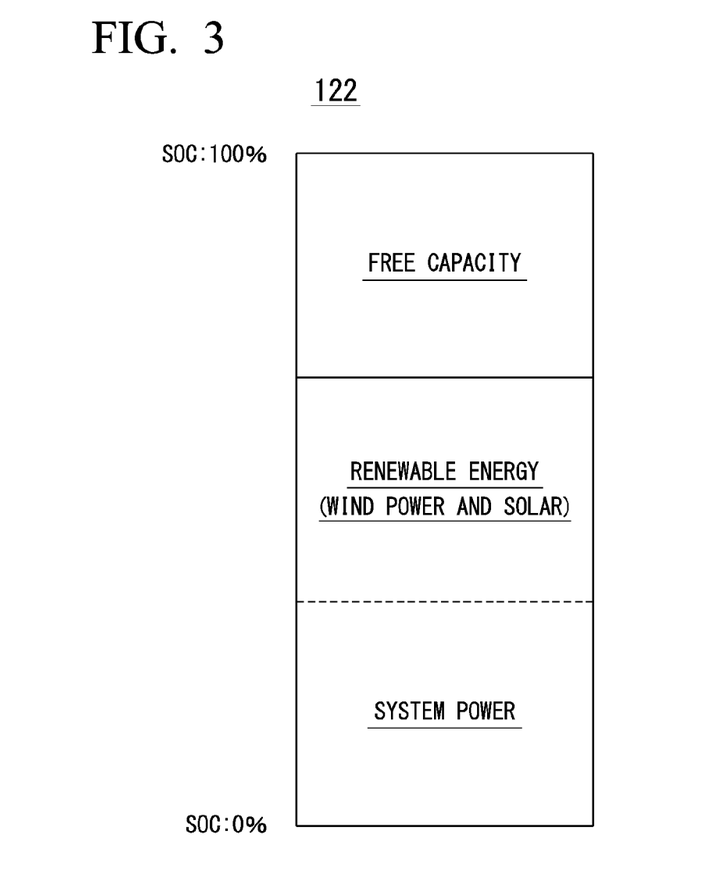
FIG. 3 is a diagram schematically illustrating an example of content of breakdown information of power production source.

The power storage management unit 104 stores information indicating the power supply source for the power stored in the power storage 206 in the data storage 120 as the breakdown information of power production source 122 in association with an amount of stored power on the basis of the system status information and the power generator status information. FIG. 3 is a diagram schematically illustrating an example of content of the breakdown information of power production source 122. As illustrated, the breakdown information of power production source 122 is information in which an amount of stored power acquired from each of renewable energy and system power (power acquired from a electric power system) is described with a state of charge (SOC) or an amount of power (kW) of the power storage 206 as an axis.

Figure 4:
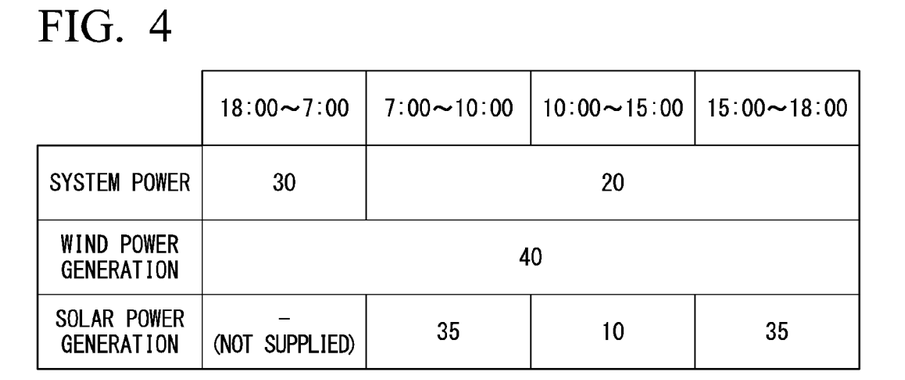
FIG. 4 is a diagram illustrating an example of changes in power fee for each of time periods.

The power storage management unit 104 performs addition to the respective amounts of stored power from the renewable energy and the system power in the breakdown information of power production source 122 on the basis of the amount of generated power included in the system status information and the power generator status information at predetermined time intervals. For example, the power storage management unit 104 determines that cheap power is preferentially supplied to the power storage 206 on the basis of a power fee for each of time periods. FIG. 4 is a diagram illustrating an example of changes in power fee for each of time periods. The power fee is changed from moment to moment, and is presented to the stored power production source management device 100 from the system management device 12-A or the power generator management devices 12-B and 12-C. As illustrated, it is assumed that power by solar power generation is cheapest in the daytime and cannot be supplied at night. However, the power storage management unit 104 may perform management so that a certain proportion of power from renewable energy is stored in preparation for a need to use power from renewable energy even when the power is expensive for reduction of an environmental load. The power storage management unit 104 may preferentially perform charging for a type of power that is considered to be insufficient from a current management status. Therefore, the power storage management unit 104 may transmnit a discharging request to the system management device 12-A and the power generator management devices 12-B and 12-C so that desired type of power is discharged.

Incidentally, in reality, it is difficult to limit a source of power to be stored in the power storage 206 unless power lines are individually provided. Therefore, in order to give a realistic representation regarding the sources of the power stored in the power storage 206, the power storage management unit 104 (1) returns information indicating that power has been received and information on an amount of received power to the power generator management device 12-B, (2) controls the charging and discharging device 202 so that the returned amount of power (in addition, a total amount of power when system power is acquired in parallel) is stored, and (3) performs a payment process so that a power fee corresponding to the wind power generator 10-B presented in advance is paid to an operator of the wind power generator 10-B, assuming that power from the wind power generator 10-B has been stored in the power storage 206 and performs management, for example, in response to a power receiving request from the power generator management device 12-B. Instead of (or in addition to) this, a power generation source may generate power generation status information and transmit the power generation status information to the stored power production source management device 100, and may ensure reliability using a technology such as blockchain.

Figure 5:
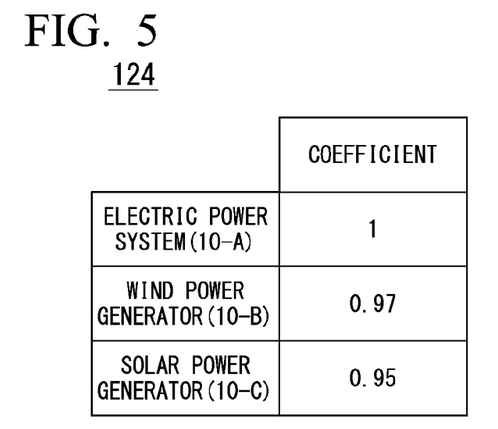
FIG. 5 is a diagram illustrating an example of content of a power transmission loss coefficient.

The power storage management unit 104 further adds the amount of power discounted in consideration of a transmission loss to a corresponding item of the breakdown information of power production source 122 with respect to the amount of power that is a power fee payment target. FIG. 5 is a diagram illustrating an example of content of the power transmission loss coefficient 124. The power transmission loss coefficient 124 is information indicating a ratio of the power stored in the power storage 206 to the transmitted power for each power supply source. The power transmission loss coefficient 124 is calculated in advance on the basis of, for example, a position of each generator and is stored in the data storage 120.

The power storage management unit 104 controls the charging and discharging device 202 such that the progress of deterioration of the secondary battery of the power storage 206 is inhibited.

Figure 6:
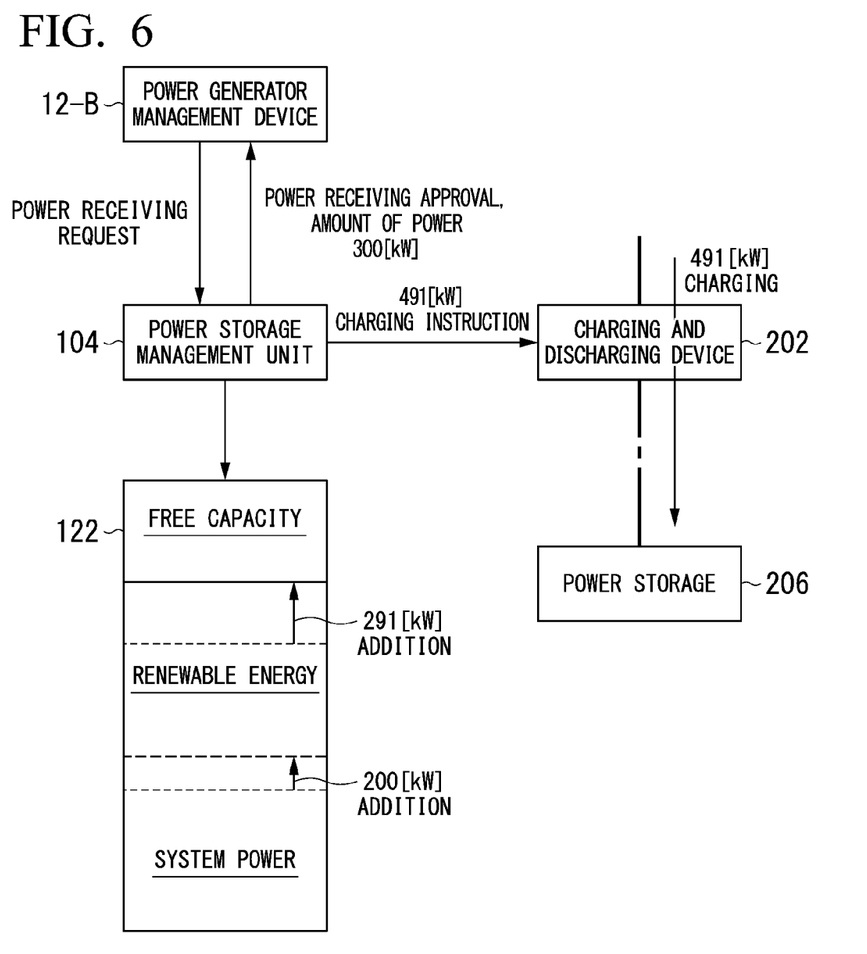
FIG. 6 is a diagram schematically illustrating an example of content of processing of a power storage management unit.

FIG. 6 is a diagram schematically illustrating an example of content of the processing of the power storage management unit 104 described above. For example, the power storage management unit 104 sends a power receiving approval in response to the power receiving request from the power generator management device 12-B in a certain control cycle, and notifies that an amount of power of 300 [kW] has been received. When the power storage management unit 104 determines that 200 [kW] of power has also been purchased from the electric power system 10-A at the same time on the basis of a desired logic, the power storage management unit 104 instructs the charging and discharging device 202 to perform charging with, for example, a total of 300×0.97+200=491 [kW]. In this case, the power storage management unit 104 adds 300×0.97=291 [kW] to an item of the renewable energy of the breakdown information of power production source 122 and 200 [kW] to an item of the system power. Accordingly, a power supply source for stored power is virtually specified. On the other hand, an amount of power to be stored in the power storage 206 may be first determined, and the amount of power multiplied by a reciprocal of the transmission loss coefficient may be transmitted to the power generator management devices 12-B and 12-C. The power storage management unit 104 may further reflect an amount of power decreasing due to natural discharging in an amount of power stored in the power storage 206 in the breakdown information of power production source 122. For example, the power storage management unit 104 may periodically calculate the amount of stored power that decreases due to natural discharging on the basis of a status or usage environment (a temperature, a SOC, a charging and discharging frequency, or the like) of the power storage 206 and reflect the amount of stored power in the breakdown information of power production source 122. In this case, the amount of stored power that decreases due to natural discharging may be calculated on the basis of a time when and a place from which the power is supplied, using information on a time period in which the power storage has been performed. In this case, the fee determination unit 106 may multiply a fee by a reciprocal of an amount decreasing due to natural discharging.

The fee determination unit 106, for example, presents, to the load terminal devices 22-A and 22-B, a fee obtained by adding an operation cost to a power fee (an acquisition cost) presented from the system management device 12-A or the power generator management devices 12-B and 12-C. Here, when power acquired at a different power fee due to a change in the time period is included for each of the renewable energy and the electric power system, the fee determination unit 106 may determine an acquisition cost by, for example, obtaining a moving average of the power fee. Further, according to changes in a discharging request from the load terminal devices 22-A and 22-B, the fee determination unit 106 may increase a fee for the load terminal device with a more request. Further, when a demand for power from the renewable energy is high, a premium may be added to the power from the renewable energy and a high fee may be set, or a low fee for the power for the renewable energy may be intentionally set to promote renewable energy. Further, the fee determination unit 106 may increase the fee when the SOC decreases and approaches a first prescribed value (for example, 20%), and decrease the fee when the SOC increases and approaches a second prescribed value (for example, 80%). Accordingly, it is possible to curb progress of deterioration of the power storage 206.

[Discharging Management]

When the discharging management unit 108 causes the power storage 206 to be discharged and supplies power to consumers (the load devices 20-A and 20-B), the discharging management unit 108 performs a process of virtually specifying a power supply source for power to be supplied and subtracting an amount of power to be supplied to the consumer from an amount of power corresponding to the specified power supply source in the breakdown information of power production source 122. More specifically, the discharging management unit 108 virtually specifies the power supply source for the power to be supplied to the load device 20-A or 20-B on the basis of the demand information from the load terminal device 22-A or 22-B. For example, when the demand information for designating renewable energy is acquired from the load terminal device 22-A as illustrated in FIG. 2, the discharging management unit 108 (1) returns information indicating discharging to the load terminal device 22-A, (2) controls the charging and discharging device 202 so that the power of the received amount of power included in the demand information is discharged, (3) performs a process of charging a fee for each power supply source designated by the demand information to the operator of the load device 20-A, and (4) subtracts an amount corresponding to the amount of power to be discharged from a corresponding item (renewable energy) of the breakdown information of power production source 122. Accordingly, the stored power production source management device 100 can perform information management as if the power has been supplied to the consumer from the power supply source designated by the consumer. When information for designating the power supply source is not included in the demand information or when discharging is requested in a form other than the demand information (that is, when information for designating the power supply source is not acquired from the device of the consumer who requests the discharging), the discharging management unit 108 may specify the power supply source for the power to be supplied to the consumer on the basis of preset setting information. The setting information may be determined on the basis of a designation of the consumer or may be uniformly determined by the stored power production source management device 100. Further, the stored power production source management device 100 may automatically determine setting information in consideration of a demand and supply balance at each time point.

Figure 7:
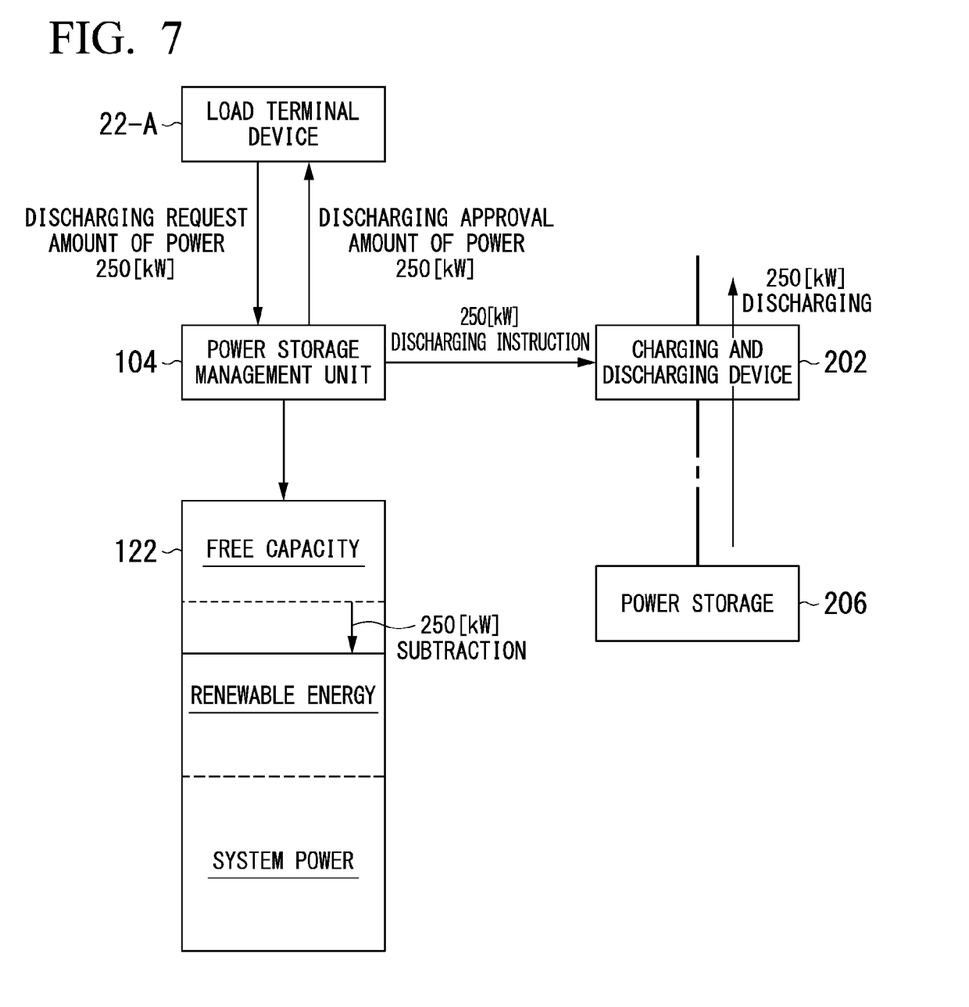
FIG. 7 is a diagram schematically illustrating an example of content of processing of a discharging management unit.

FIG. 7 is a diagram schematically illustrating an example of content of the processing of the discharging management unit 108 described above. For example, the discharging management unit 108 sends a discharging approval in response to a discharging request of 250 [kW] from the load terminal device 22-A in a certain control cycle, and notifies that the amount of power of 250 [kW] is discharged. The discharging management unit 108 instructs the charging and discharging device 202 to discharge 250 [kW]. In this case, the discharging management unit 108 may instruct the charging and discharging device 202 to discharge more than 250 [kW] in consideration of a transmission loss to the load device 20-A. The discharging management unit 108 subtracts 250 [kW] from the item of renewable energy in the breakdown information of power production source 122. This virtually specifies a power supply source for the discharged power.

Figure 8:
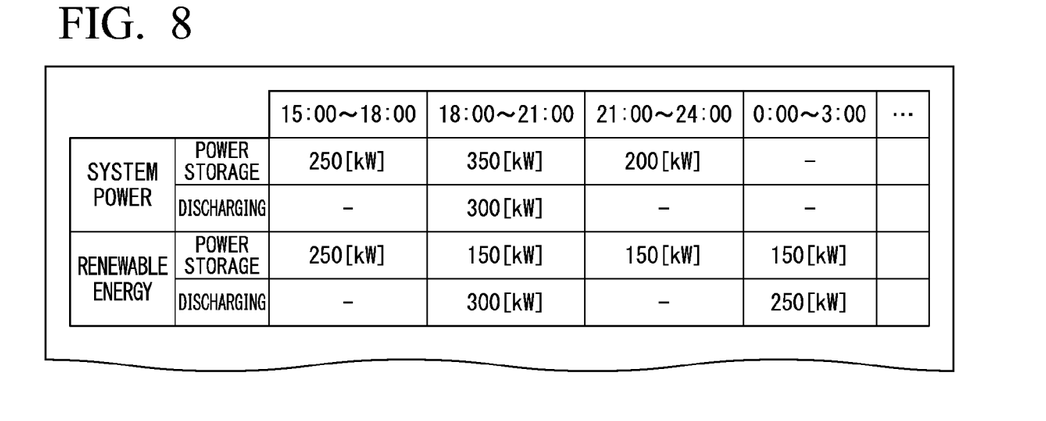
FIG. 8 is a diagram illustrating an example of an image provided by an information providing unit.

The information providing unit 110 provides various devices with information indicating a history of processing of the power storage management unit 104 and the discharging management unit 108. Information indicating the history of the processing of the power storage management unit 104 and the discharging management unit 108 is, for example, a history of power storage and discharging for each control cycle and each power supply source. The information providing unit 110 has, for example, a function of a web server or an application server, and can provide an image in the form of a web page. FIG. 8 is a diagram illustrating an example of an image provided by the information providing unit 110. By referring to such information, for example, the consumer can ascertain a supply and demand relationship of power in detail.

[Control at Time of Parallel Request: Power Storage]

Hereinafter, control in a case in which there are power receiving requests from a plurality of power supply sources will be described.

(Pattern 1)

When the acquisition unit 102 acquires power receiving requests from a plurality of power generator management devices at the same time (for example, in the same control cycle), the power storage management unit 104 selects one generator on the basis of a predetermined rule, for example, and performs the process described with reference to FIG. 6 on the selected generator. The predetermined rule is a rule such as selecting a generator with a lower power fee, selecting a generator with a lower transmission loss, and selecting a generator with less burden on a transmission facility.

(Pattern 2)

When the acquisition unit 102 acquires power receiving requests from a plurality of power generator management devices at the same time (for example, in the same control cycle), the power storage management unit 104 may assume that the power is supplied from each of the plurality of generators in parallel and perform the process described with reference to FIG. 6.

[Control at Time of Parallel Requests: Discharging]

Hereinafter, control in a case in which there are discharging requests from a plurality of consumers will be described.

(Pattern 1)

When the acquisition unit 102 acquires discharging requests from a plurality of load terminal devices at the same time (for example, in the same control cycle), the discharging management unit 108 selects one load device on the basis of a predetermined rule, for example and performs the process described with reference to FIG. 7 on the selected load device.

(Pattern 2)

When the acquisition unit 102 acquires discharging requests from a plurality of load terminal devices at the same time (for example, in the same control cycle), the discharging management unit 108 may receive power to each of the plurality of load devices in parallel and perform the process described with reference to FIG. 7. In this case, only a part of an amount of power included in demand information may be supplied.

Other Embodiment 1

Figure 9:
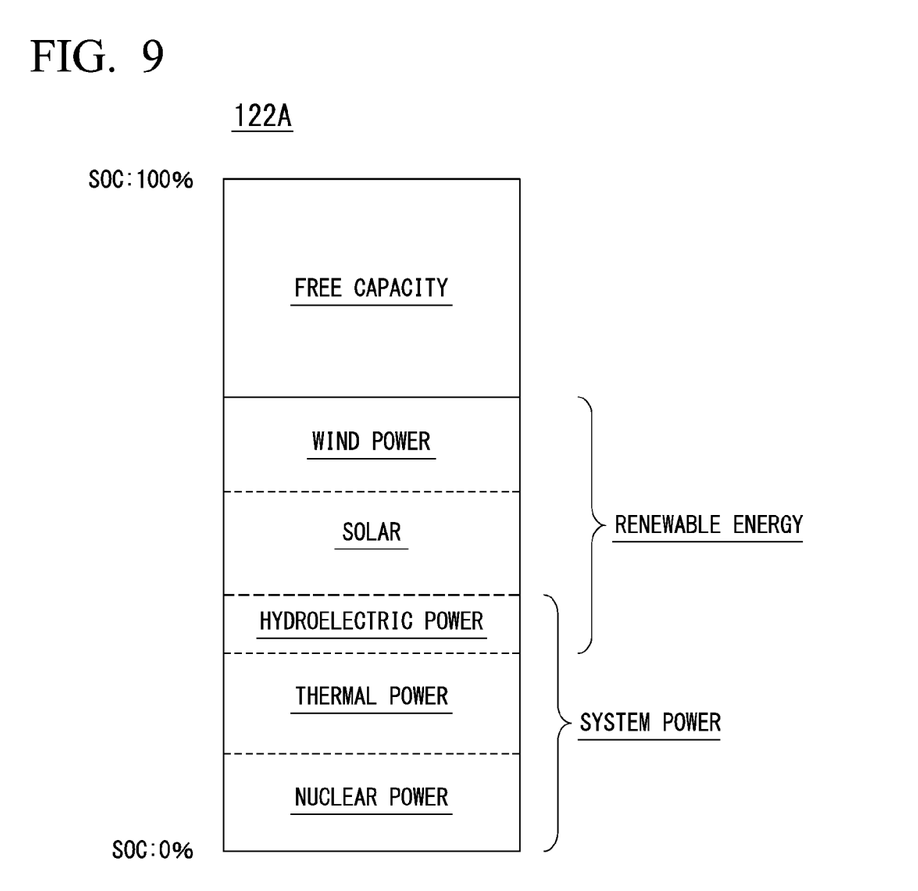
FIG. 9 is a diagram schematically illustrating an example of content of breakdown information of power production source according to another embodiment.

Although in the above embodiment, a case in which the power from the electric power system is uniformly treated as the system power has been described, the power from the electric power system may be classified for each type of generator and managed with the breakdown information of power production source. FIG. 9 is a diagram schematically illustrating an example of content of the breakdown information of power production source 122A according to another embodiment. In the example of this figure, power generated by the hydroelectric generator in the system power may be treated as renewable energy. In this case, information on a priority is included in the demand information, and the discharging management unit 108 may select the next best power supply source on the basis of the priority, for example, when the amount of power from the renewable energy included in the demand information exceeds the amount of power from the renewable energy described in the breakdown information of power production source 122A, and perform discharging management. For example, in the demand information, the renewable energy is designated as power supply source designation information, and content that thermal power is in preference to nuclear power is specified as a priority. When the amount of power from the renewable energy virtually stored in the power storage 206 is smaller than an amount of energy relevant to the demand request, the discharging management unit 108 performs control so that the power generated by the thermal power generator is provided to the load device.

Other Embodiment 2

In the above embodiment, it is assumed that an amount of power generated for each generator and a type of power generation are included in the system status information, but such information is not included in the system status information, but information on generated power may be simply included. Further, the system status information may not be acquired from the system management device 12-A. Further, although "the power storage management unit 104 performs addition to the respective amounts of stored power from the renewable energy and the system power in the breakdown information of power production source 122 on the basis of the amount of generated power included in the system status information and the power generator status information at predetermined time intervals", the power storage management unit 104 may acquire a desired amount of power from the electric power system 10-A at a desired timing and store the power in the power storage 206 of the power storage device 200, regardless of the system status information.

Other Embodiment 3

The system status information may further include information on a power generation place (a position of a generator), and the stored power production source management device 100 may manages an amount of stored power in each power generation place, and receive a discharging request having a designated power generation place from the load terminal devices 22-A and 22-B. Thus, it is possible to respond a need for purchase of power generated in a specific area (for example, a need based on a motive such as hometown support or local production for local consumption).

Information on the power generation place is included, for example, in the system status information with power generator status information tagged at a power generation source. Information such as blockchain may be adopted to ensure that this information is authentic and is not tampered with. Information on a price range may be added to the information on the power generation place.

Other Embodiment 4

Although in the above embodiment, the power supply source is exclusively a generator, another power storage device may be treated as the power supply source. In this case, the other power storage device may function as a buffer for temporarily storing power when the SOC of the power storage 206 is close to 100%, or the stored power production source management device 100 may receive a discharging request from the other power storage device and perform discharging.

Other Embodiment 5

Further, a virtual power plant (VPP) may be treated as a power supply source. The VPP refers to an entity that behaves as a power generator in which, for example, a device using a certain amount of power throughout the day temporarily curbs power consumption so that relatively surplus power is generated. For example, a lighting device in a station or a department store, a factory, or a water treatment device can be a VPP.

Other Embodiment 6

Although in the above embodiment, the power storage 206 common to the plurality of power supply sources is included, a physically separate power storage 206 may be used for each of the plurality of power supply sources.

According to at least one embodiment described above, the acquisition unit 102 that acquires the first information indicating a power supply source when the power storage 206 is charged, the power storage management unit 104 that stores information indicating a power supply source for power stored in the power storage 206 in the data storage 120 in association with the amount of stored power on the basis of the first information, and the discharging management unit 108 that virtually specifies the power supply source for the power to be supplied when the power storage 206 is discharged and the power is supplied to the consumer, and subtracts the amount of power to be supplied to the consumer from the amount of power corresponding to the specified power supply source in the data storage 120 are included so that convenience regarding use of power can be improved and smoother power interchange can be realized.

For example, for consumers who desires to receive power mainly from the renewable energy but do not have a power generator for renewable energy nearby, it is possible to reduce an amount of $CO_2$ emission of the consumers while omitting facility investment when an objective proof can be obtained even virtually for an operation made by receiving the power from the renewable energy. It is also possible to selectively receive cheap power while observing a fee that fluctuates depending on a time period. For the power supply side, it is possible to increase the number of power supply destinations due to presence of the stored power production source management device 100 that stores power as a buffer and divides the supply of power according to demand information of a consumer. It is possible to achieve various effects regarding use of power by virtually specifying and managing the power supply source in this way.

Although some embodiments of the present invention have been described, these embodiments are presented as examples and are not intended to limit the scope of the invention. These embodiments can be implemented in various other forms, and various omissions, replacements, and changes can be made without departing from the gist of the invention. These embodiments or modifications thereof are included in the scope or gist of the invention, as well as in a scope of the invention described in the claims and an equivalent scope thereof.

What is claimed is:

1. A stored power production source management device comprising:
   a memory that stores a set of processor executable instructions;
   a hardware processor configured to execute the set of processor executable instructions, causing the hardware processor to perform a method comprising:
      for each of a plurality of power supply sources that supply power to charge a power storage:
         acquiring first information identifying at least a type of the power supply source from among a plurality of types of power supply sources, storing, in a data storage on the basis of the first information, power supply source indication information indicating the type of the power supply source, and associating the power supply source indication information with information indicating an amount of power supplied by the power supply source that is stored in the power storage, and managing discharge of power from the power storage to a consumer by:

acquiring, from a consumer device associated with a consumer, second information including:

information indicating a demand amount of power, information designating a preferred type of power supply source, and information indicating a priority of the preferred type of power supply source, virtually specifying one power supply source from among the plurality of power supply sources to supply power to the consumer on the basis of the second information, subtracting the demand amount of power from the amount of power supplied by the virtually specified power supply source that is stored in the power storage, and in a case where the amount of power supplied by the virtually specified power supply source that is stored in the power storage is smaller than the demand amount of power, virtually specifying, based on the priority, an additional type of power supply source from among the plurality of types of power supply sources, other than the preferred type of power source, to supply power to the consumer.

2. The stored power production source management device according to claim 1, wherein the second information includes a power discharging request from the consumer, and in a case where power discharging requests are received from a plurality of consumers at the same time, the method further comprises:

selecting one consumer from among the plurality of consumers on the basis of a predetermined rule, and managing discharge of power from the power storage to the selected consumer.

3. The stored power production source management device according to claim 1, wherein the second information includes a power discharging request from the consumer, and in a case where power discharging requests are received from a plurality of consumers at the same time, the method further comprises:

managing discharge of power from the power storage to the plurality of consumers.

4. The stored power production source management device according to claim 1, wherein the first information includes information indicating an amount of power supplied from a device of the power supply source, and the information indicating an amount of power supplied by the power supply source that is stored in the power storage includes an amount of power lost in transmission.

5. The stored power production source management device according to claim 1, wherein the method further comprises providing information indicating a history of the charging and discharging of the power storage.

6. The stored power production source management device according to claim 1, wherein method further comprises:

determining a fee for power on the basis of at least one of:
an amount of power that can be stored,
a power transmission loss,
wear of a transmission facility,
the type of power supply source, and
an amount decreased due to natural discharging, and presenting the fee to the consumer device associated with the consumer.

7. The stored power production source management device according to claim 1, wherein method further comprises:

virtually specifying one power supply source from among the plurality of power supply sources to supply power to the consumer on the basis of preset setting information.

8. A stored power production source management method comprising:

for each of a plurality of power supply sources that supply power to charge a power storage:

acquiring first information identifying at least a type of the power supply source from among a plurality of types of power supply sources, storing, in a data storage on the basis of the first information, power supply source indication information indicating the type of the power supply source, and associating the power supply source indication information with information indicating an amount of power supplied by the power supply source that is stored in the power storage, and managing discharge of power from the power storage to a consumer by:

acquiring, from a consumer device associated with a consumer, second information including:

information indicating a demand amount of power, information designating a preferred type of power supply source, and information indicating a priority of the preferred type of power supply source, virtually specifying one power supply source from among the plurality of power supply sources to supply power to the consumer on the basis of the second information, subtracting the demand amount of power from the amount of power supplied by the virtually specified power supply source that is stored in the power storage, determining that the amount of power supplied by the virtually specified power supply source that is stored in the power storage is smaller than the demand amount of power, and virtually specifying, based on the priority, an additional type of power supply source from among the plurality of types of power supply sources, other than the preferred type of power source, to supply power to the consumer.

9. A non-transitory computer-readable data storage medium storing a set of processor executable instructions to be executed by a hardware processor to cause the hardware processor to perform a stored power production source management method comprising:

for each of a plurality of power supply sources that supply power to charge a power storage:

acquiring first information identifying at least a type of the power supply source from among a plurality of types of power supply sources, storing, in a data storage on the basis of the first information, power supply source indication information indicating the type of the power supply source, and associating the power supply source indication information with information indicating an amount of power supplied by the power supply source that is stored in the power storage, and managing discharge of power from the power storage to a consumer by:

acquiring, from a consumer device associated with a consumer, second information including:

information indicating a demand amount of power, information designating a preferred type of power supply source, and information indicating a priority of the preferred type of power supply source, virtually specifying one power supply source from among the plurality of power supply sources to supply power to the consumer on the basis of the second information, subtracting the demand amount of power from the amount of power supplied by the virtually specified power supply source that is stored in the power storage, determining that the amount of power supplied by the virtually specified power supply source that is stored in the power storage is smaller than the demand amount of power, and virtually specifying, based on the priority, an additional type of power supply source from among the plurality of types of power supply sources, other than the preferred type of power source, to supply power to the consumer.

* * * * *

UNITED STATES PATENT AND TRADEMARK OFFICE
CERTIFICATE OF CORRECTION

| | | |
|---|---|---|
| PATENT NO. | : 12,107,716 B2 | Page 1 of 1 |
| APPLICATION NO. | : 17/530379 | |
| DATED | : October 1, 2024 | |
| INVENTOR(S) | : Shibuya et al. | |

It is certified that error appears in the above-identified patent and that said Letters Patent is hereby corrected as shown below:

In the Claims

• Claim 6, Column 12, Line 5, "wherein method" should read as --wherein the method--.

• Claim 7, Column 12, Line 16, "wherein method" should read as --wherein the method--.

Signed and Sealed this
Tenth Day of December, 2024

Katherine Kelly Vidal
*Director of the United States Patent and Trademark Office*